(12) United States Patent
Janczak et al.

(10) Patent No.: US 8,613,333 B2
(45) Date of Patent: Dec. 24, 2013

(54) METHOD OF OPERATING A HYBRID POWERTRAIN

(71) Applicant: GM Global Technology Operations, Inc., Detroit, MI (US)

(72) Inventors: John Janczak, Commerce Township, MI (US); Anthony H. Heap, Ann Arbor, MI (US); Neal A. Chaperon, Commerce Township, MI (US); Sean W. McGrogan, Ann Arbor, MI (US); James Sydenstricker, Linden, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 13/716,857

(22) Filed: Dec. 17, 2012

(65) Prior Publication Data

US 2013/0124025 A1     May 16, 2013

Related U.S. Application Data

(63) Continuation-in-part of application No. 12/686,460, filed on Jan. 13, 2010, now abandoned.

(51) Int. Cl.
*B60W 20/00* (2006.01)
*B60W 10/06* (2006.01)
*B60W 10/08* (2006.01)
*B60W 10/26* (2006.01)

(52) U.S. Cl.
USPC ............ 180/65.28; 180/65.265; 903/905; 903/906; 903/907

(58) Field of Classification Search
USPC .......... 180/65.28, 65.225, 65.22, 65.265, 180/65.275; 903/907, 906, 905, 904, 903, 903/902; 701/22
See application file for complete search history.

(56) References Cited

U.S. PATENT DOCUMENTS

2009/0159351 A1   6/2009  Ando et al.
2011/0165992 A1   7/2011  Ueno et al.

*Primary Examiner* — Keith Frisby
(74) *Attorney, Agent, or Firm* — Quinn Law Group, PLLC

(57) ABSTRACT

A method of operating a hybrid powertrain including an engine, an electric motor and a high voltage battery includes preventing fuel flow to the engine when the high voltage battery includes a state of charge at or above a pre-defined upper limit, and when the hybrid powertrain is operating in a second fueling condition in which fuel flow to the engine is preferably maintained. The engine is rotated with torque supplied by the electric motor to maintain rotation of the engine without producing any engine torque.

18 Claims, 1 Drawing Sheet

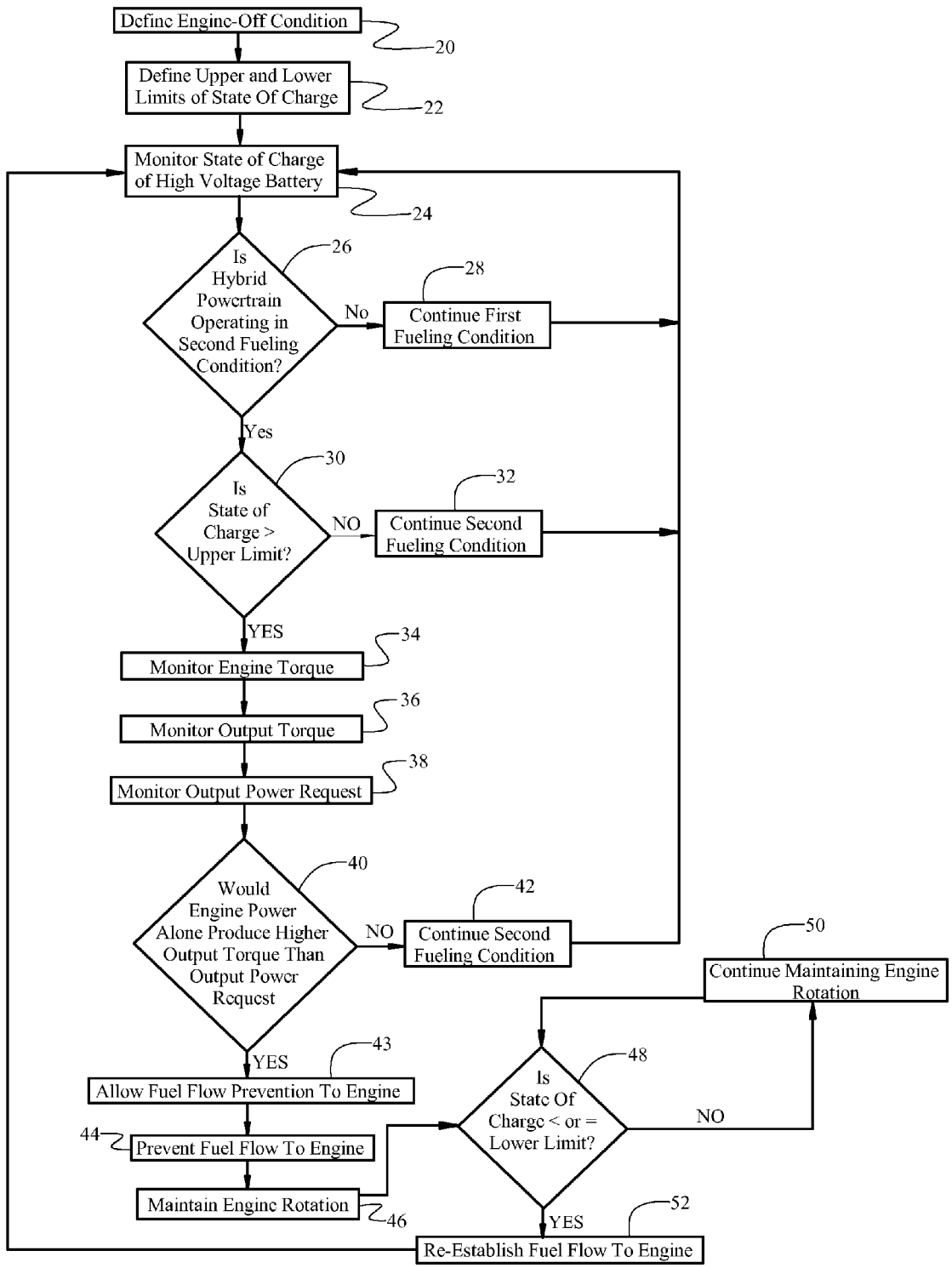

METHOD OF OPERATING A HYBRID POWERTRAIN

CROSS-REFERENCE TO RELATED APPLICATIONS

This application is a Continuation In Part of U.S. patent application Ser. No. 12/686,460, filed on Jan. 13, 2010.

TECHNICAL FIELD

The invention relates to a method of operating a hybrid powertrain.

BACKGROUND OF THE INVENTION

Hybrid powertrains typically include an engine, a transmission, an electric motor/generator and a high voltage battery. The transmission is coupled to the engine as is well known. The engine may produce an engine torque, which is supplied to the transmission. Alternatively, the electric motor/generator may convert an electric current from the high voltage battery into a torque, which is supplied to the transmission. The transmission includes a plurality of gears, operable to achieve a plurality of gear ratios as is well known. The transmission converts the torque from the engine and/or the electric motor/generator into an output torque, which is supplied to the wheels to power the vehicle. Excess torque from the engine, not needed to power the vehicle may be used by the electric motor/generator to generate electricity to charge the high voltage battery.

In operation, the high voltage battery is typically only charged up to a pre-defined upper limit. In other words, the high voltage battery should not be charged further once achieving the pre-defined upper limit. Continuous or further charging of the high voltage battery above and beyond the pre-defined upper limit may damage the high voltage battery.

When the high voltage battery is at or near the pre-defined upper limit, the hybrid powertrain may disconnect a fuel flow to the engine to disengage operation of the engine and cease engine torque production. Disengaging the operation of the engine prevents any additional charging of the high voltage battery. When the engine is operating in a condition in which the fuel flow to the engine may be disconnected, such as to prevent overcharging of the high voltage battery, then the engine is operating in a fuel-off enabled condition, i.e., the ability to prevent fuel flow to the engine is enabled. However, certain vehicle conditions exist in which the operation of the engine should not be disengaged because the high voltage battery may not have the ability to restart the engine when needed. For example, if the vehicle is traveling at or below a minimum speed, or if the temperature of the high voltage battery is below a minimum temperature, then the engine should not be disengaged. When the engine is operating in a condition in which the fuel flow to the engine should be maintained in order to satisfy an existing vehicle condition, such as when the electric motor may not be able to engage or otherwise re-start the engine, then the engine is operating in a fuel-off disabled condition, i.e., the ability to prevent fuel flow to the engine is disabled.

When the high voltage battery is at or above the pre-defined upper limit, and the hybrid powertrain is operating in the fuel-off disabled condition such that the fuel flow to the engine is maintained, then the excess torque produced by the engine is transferred to the transmission causing output torque spikes. The output torque spikes are undesirable, and may cause the vehicle to buck.

SUMMARY OF THE INVENTION

A method of operating a hybrid powertrain of a vehicle is disclosed. The hybrid powertrain includes an engine, an electric motor and a high voltage battery. The method includes monitoring a state of charge of the high voltage battery. The state of charge of the high voltage battery is monitored to determine if the state of charge is above a pre-defined upper limit. Fuel flow to the engine is prevented to stop engine torque production when the state of charge of the high voltage battery is greater than the pre-defined upper limit, and when the hybrid powertrain is operating in a second fueling condition in which fuel flow to the engine is preferably maintained. The engine is rotated with torque supplied by the electric motor while the fuel flow to the engine is prevented and the hybrid powertrain is operating in the second fueling condition.

In another aspect of the invention, a method of operating a hybrid powertrain of a vehicle is also disclosed. The hybrid powertrain includes an engine, an electric motor and a high voltage battery. The method includes monitoring a state of charge of the high voltage battery. The state of charge of the high voltage battery is monitored to determine if the state of charge is above a pre-defined upper limit. The method further includes comparing an engine torque of the engine to an output power request to determine if the engine torque produces an output torque greater than the output power request. Fuel flow to the engine is prevented stop engine torque production when the state of charge of the high voltage battery is greater than the pre-defined upper limit, the engine torque produces an output torque greater than the output power request, and when the hybrid powertrain is operating in a second fueling condition in which fuel flow to the engine is preferably maintained. The engine is rotated with torque supplied by the electric motor while the fuel flow to the engine is prevented and the hybrid powertrain is operating in the second fueling condition to maintain rotation of the engine and discharge the high voltage battery.

In another aspect of the invention, a method of operating a hybrid powertrain of a vehicle is disclosed. The hybrid powertrain includes an engine, an electric motor and a high voltage battery. The method includes monitoring a state of charge of the high voltage battery. The state of charge of the high voltage battery is monitored to determine if the state of charge is above a pre-defined upper limit. The method further includes comparing an engine torque of the engine to an output power request to determine if the engine torque produces an output torque of the hybrid powertrain that is greater than the output power request. Fuel flow to the engine is prevented to stop torque production when the state of charge of the high voltage battery is greater than the pre-defined upper limit, the engine torque produces an output torque greater than the output power request, and when the hybrid powertrain is operating in a second fueling condition in which fuel flow to the engine is preferably maintained. The engine is rotated with torque supplied by the electric motor while the fuel flow to the engine is prevented and the hybrid powertrain is operating in the second fueling condition to maintain rotation of the engine. The fuel flow to the engine is re-established when the state of charge falls to a pre-defined lower limit.

Accordingly, when the state of charge of the high voltage battery is at or above the pre-defined upper limit, the engine is producing torque in excess of the torque required by the vehicle, and the engine is operating in the second fueling condition in which the fuel flow to the engine should normally be maintained in order to satisfy an existing vehicle condition, then the disclosed method prevents the fuel flow to the engine even though fuel flow to the engine should normally be maintained, but maintains rotation of the engine by rotating the engine with torque provided by the electric motor. As such, the operation, i.e., rotation, of the engine is maintained without fueling the engine and without the engine producing any unnecessary engine torque. This stabilizes the operation of the hybrid powertrain and eliminates any output torque spikes, while simultaneously discharging the high voltage battery.

The above features and advantages and other features and advantages of the present invention are readily apparent from the following detailed description of the best modes for carrying out the invention when taken in connection with the accompanying drawings.

BRIEF DESCRIPTION OF THE DRAWINGS

FIG. 1 is flow chart showing a method of operating a hybrid powertrain.

DESCRIPTION OF THE PREFERRED EMBODIMENTS

A method of operating a hybrid powertrain of a vehicle is disclosed. The hybrid powertrain includes an engine, a transmission, an electric motor and a high voltage battery.

The engine preferably includes, but is not limited to, an internal combustion engine. However, the engine may include some other type of engine. The engine is powered by a fuel. The fuel may include, but is not limited to, gasoline or diesel fuel. The internal combustion engine converts the energy stored within the fuel to rotate a crankshaft, which outputs an engine torque as is well known. The specific type, style, size and/or configuration of the engine is not pertinent to the method disclosed. Accordingly, the engine is not described in detail herein.

The electric motor preferably includes an electric motor/generator, and is coupled to both the engine and the transmission. The electric motor/generator is configured to transfer torque to and from both the engine and the transmission. When operating as an electric motor, the electric motor/generator converts an electric current from the high voltage battery into a motor torque, which is transferred to the transmission to drive the vehicle. When operating as a generator, the electric motor/generator uses at least a portion of the engine torque to generate electricity, which is used to charge the high voltage battery. The electric motor/generator may include any type and/or style of electric motor/generator suitable for use in the hybrid powertrain. The specific type, style, size and/or configuration of the electric motor/generator is not pertinent to the method disclosed. Accordingly, the electric motor/generator is not described in detail herein.

The transmission is coupled to the engine and converts the engine torque and/or the motor torque from the engine and/or the electric motor/generator respectively into a slower or faster rotational output, i.e., an output torque, as is known. The output torque is transferred to at least one drive wheel of the vehicle to drive the vehicle. The transmission may include any type and/or style of transmission capable of converting the torque from the engine and/or the electric motor into the output torque. The specific type, style, size and/or configuration of the transmission is not pertinent to the method disclosed. Accordingly, the transmission is not described in detail herein.

The high voltage battery stores an electrical charge, and provides a current to power the electric motor/generator, as well as other vehicle accessories. The high voltage battery may include any high voltage battery suitable for use in the hybrid powertrain. The specific type, style, size and/or configuration of the high voltage battery is not pertinent to the method disclosed. Accordingly, the high voltage battery is not described in detail herein.

The hybrid powertrain may further include a controller. The controller is in communication with the engine, the electric motor/generator, the high voltage battery and the transmission. The controller receives data signals from each of the engine, the electric motor/generator, the high voltage battery and the transmission providing information thereto, and sends signals to each of the engine, the electric motor/generator, the high voltage battery and the transmission to control the operation thereof. The controller may include, but is not limited to, a computer or similar device. The controller may include a processor, a memory, software, hardware, and any other component necessary to control and/or communicate with the engine, the electric motor/generator transmission or the transmission. The specific type, style, size and/or configuration of the controller is not pertinent to the method disclosed. Accordingly, the controller is not described in detail herein.

The method described below is preferably encoded in software operable on the controller. As such, the controller receives the required information from each of the engine, the electric motor/generator, the high voltage battery and the transmission, processes the information, determines the appropriate action to implement, and signals at least one of the engine, the electric motor/generator, the high voltage battery and the transmission to implement the appropriate action.

Referring to FIG. 1, the method includes defining a first fueling condition and defining a second fueling condition (block 20). The first fueling condition is a state of operation of the hybrid powertrain and/or vehicle in which the fuel flow to the engine may be turned off, i.e., disconnected. Accordingly, when operating in the first fueling condition, the ability to prevent fuel flow to the engine is enabled and the fuel flow to the engine may be turned off to stop operation and/or torque production by the engine. For example, when operating at high vehicle speeds, the fuel flow to the engine may be turned off to stop torque production by the engine. Therefore, the hybrid powertrain may operate in the first fueling condition when operating at high vehicle speeds. The second fueling condition is a state of operation of the hybrid powertrain and/or vehicle in which the fuel flow to the engine should not be turned off, i.e., the fuel flow to the engine should not be disconnected. Accordingly, when operating in the second fueling condition, the ability to prevent fuel flow to the engine is generally disabled, and fuel flow to the engine is normally maintained to maintain operation of the engine, except as described in detail below, wherein fuel flow to the engine is prevented to stop torque production even though the vehicle is operating in the second fueling condition. For example, when operating at low vehicle speeds, the fuel flow to the engine should not be turned off in order to maintain operation, i.e., torque production, of the engine. Therefore, the hybrid powertrain may operate in the second fueling condition when operating at low vehicle speeds, such that fuel flow to the engine is preferably maintained to keep the engine running.

The second fueling condition may include a speed of the vehicle, a temperature of the high voltage battery, a charge of the high voltage battery, an operating condition of the electric motor/generator or some other condition not described herein that affects the ability of the hybrid powertrain to operate properly without operation and/or torque production by the engine. For example, when the vehicle is operating at or below a low vehicle speed, such as but not limited to, fourteen kilometers/hour (14 kph), then the electric motor/generator may not have the necessary power to re-engage the engine. Accordingly, the ability to cut-off the fuel flow to the engine is preferably disabled and the hybrid powertrain operates in the second fueling condition. It should be appreciated that the low vehicle speed is dependent upon the specific components of the hybrid powertrain and the vehicle, and may vary above or below the fourteen kilometers/hour (14 kph) described above.

The method further includes defining a pre-defined upper limit of the state of charge, and a pre-defined lower limit of the state of charge of the high voltage battery (block 22). The pre-defined upper limit of the state of charge of the high voltage battery is dependent upon the specific type, style, size and/or configuration of the high voltage battery. The pre-defined upper limit of the state of charge is the upper safe operational limit of the high voltage battery. Accordingly, operation of the high voltage battery at or above the pre-defined upper limit of the state of charge for extended periods of time may damage the high voltage battery. The pre-defined upper limit of the state of charge may be defined as any suitable percentage of charge of the high voltage battery. For example, the pre-defined upper limit may be defined to be, but is not limited to, seventy percent (70%) of the charge capacity of the high voltage battery. It should be appreciated that the pre-defined upper limit of the state of charge of the high voltage battery may vary from the seventy percent (70%) described above.

The pre-defined lower limit of the state of charge of the high voltage battery is dependent upon the specific type, style, size and/or configuration of the high voltage battery. The pre-defined lower limit of the state of charge is the lower safe operational limit of the high voltage battery. As such, the hybrid powertrain may not operate properly when the state of charge of the high voltage battery is below the pre-defined lower limit. The pre-defined lower limit of the state of charge may be defined as any suitable percentage of charge of the high voltage battery. For example, the pre-defined lower limit may be defined to be, but is not limited to, twenty percent (20%) of the charge capacity of the high voltage battery. It should be appreciated that the pre-defined lower limit of the state of charge of the high voltage battery may vary from the twenty percent (20%) described above.

The method further includes monitoring the state of charge of the high voltage battery (block 24). The state of charge of the high voltage battery is monitored to determine if the state of charge is above or below the pre-defined upper limit, and above or below the pre-defined lower limit. The state of charge of the high voltage battery is continuously monitored. The hybrid powertrain may include one or more voltage and/or current sensors configured for monitoring the state of charge of the high voltage battery, and communicating the information relating to the state of charge of the high voltage battery to the controller. It should be appreciated that the state of charge of the high voltage battery may be monitored in some other manner not described herein.

The method may further include monitoring an operating parameter to determine if the hybrid powertrain is operating (or continues to operate) in the first fueling condition in which the fuel flow to the engine may be stopped, or the second fueling condition in which the fuel flow to the engine should be maintained (block 26). The operating parameter may include a speed of the vehicle, a speed of the engine, a temperature of the high voltage battery, a charge of the high voltage battery, or some other operating parameter appropriate for determining if the engine and/or hybrid powertrain is operating in the second fueling condition or the first fueling condition. The hybrid powertrain may include one or more sensors configured for monitoring the operating parameter, and communicating the information related to the output torque to the controller. It should be appreciated that the operating parameter may be monitored in any suitable manner. The controller may receive the information related to the operating parameter, and may process the information to determine if the information related to the operating parameter indicates that the engine and/or the hybrid powertrain are operating in the first fueling condition or the second fueling condition.

If the hybrid powertrain is not operating in the second fueling condition, and is therefore operating in the first fueling condition, then the first fueling condition is allowed to continue, i.e., the engine may continue to operate in the first fueling condition (block 28) in which fuel flow to the engine may be prevented.

If the engine and/or the hybrid powertrain is operating in the second fueling condition, i.e., the fuel flow to the engine should not be turned off under normal operating conditions to maintain operation of the engine, then, the method further includes comparing the state of charge of the high voltage battery to the pre-defined upper limit (block 30) to determine if the state of charge of the high voltage battery is greater than the pre-defined upper limit. If the state of charge of the high voltage battery is not greater than the pre-defined upper limit, i.e., the state of charge of the high voltage battery is less than the pre-defined upper limit, then the engine may continue to operate in the second fueling condition (block 32) and fuel flow to the engine should be maintained.

The method may further include monitoring an engine torque produced by the engine (block 34). The engine torque is continuously monitored. The hybrid powertrain may include one or more sensors configured for monitoring the engine torque, and communicating the information related to the engine torque to the controller. It should be appreciated that the engine torque may be monitored in any suitable manner.

The method may further include monitoring an output torque of the hybrid powertrain (block 36). More specifically, the output torque from the transmission is continuously monitored. The hybrid powertrain may include one or more sensors configured for monitoring the output torque from the transmission, and communicating the information related to the output torque to the controller. It should be appreciated that the output torque may be monitored in any suitable manner.

The method may further include monitoring an output power request (block 38). The output power request is the level or amount of output torque requested by the vehicle from the hybrid powertrain to operate the vehicle at that time under the existing conditions. Accordingly, the output power request is continuously changing. As such, the output power request is continuously monitored. The controller may calculate the output power request from various inputs, including but not limited to, acceleration change, braking change, vehicle accessory loads, etc.

The method may further include comparing the engine torque to the output power request (block 40). The engine torque is compared to the output power request to determine if the engine torque is sufficient by itself to produce an output torque that is greater than the output power request. When the engine torque is capable of producing an output torque that is greater than the output torque request, then the engine is producing more engine torque than is required by the vehicle, and the excess power must be dissipated.

If the engine torque does not produce more output torque than the output power request, then the fuel-off condition is not allowed to operate, i.e., the engine continues to operate in the second fueling condition (block 42) and fuel flow to the engine should not be disrupted. When the engine does produce more output torque than the output power request, the state of charge of the high voltage battery is greater than the pre-defined upper limit, and the hybrid powertrain is operating in the second fueling condition, i.e., fuel flow to the engine should not be interrupted in order to satisfy an existing vehicle condition, then the method includes allowing the prevention of fuel flow to the engine even though the hybrid powertrain is operating in the second fueling condition. In other words, the controller temporarily overrides the second fueling condition, in which fuel flow to the engine is preferably maintained, and allows fuel flow to the engine to be prevented even though the hybrid powertrain is operating in the second fueling condition (block 43). The method may further include preventing a fuel flow to the engine (block 44). Preventing the fuel flow to the engine prevents combustion of the fuel within the engine, which, without additional power from the electric motor, stops rotation of the crankshaft and output of the engine torque, thereby disengaging the engine. When the engine is disengaged, the vehicle is powered by the electric motor. The fuel flow to the engine may be prevented by, but is not limited to, closing a valve in a fuel line supplying the fuel flow to the engine. It should be appreciated that the fuel flow may be prevented, i.e., shut off, in some other manner not described herein.

If the engine and/or the hybrid powertrain is operating in the second fueling condition, i.e., the operation of the engine should not be discontinued under normal operating conditions, the state of charge of the high voltage battery is at or above the pre-defined upper limit and the fuel flow to the engine has been prevented to prevent damage to the high voltage battery even though fuel flow to the engine should not be stopped in order to satisfy an existing vehicle condition, then the method may further include rotating the engine with torque supplied by the electric motor to maintain engine rotation (block 46). Accordingly, the electric motor/generator is used to rotate the engine, i.e., drive the engine without the fuel flow and without producing any engine torque, when the operation of the engine should not normally be discontinued. Using the electric motor/generator to maintain rotation of the engine, while the fuel flow is disconnected eliminates any excess engine torque being produced by the engine while simultaneously maintaining operation or rotation of the engine, thereby stabilizing the operation of the hybrid powertrain by eliminating output torque spikes. Additionally, using torque from the electric motor/generator to drive the engine operates to discharge the high voltage battery.

The method may further include comparing the state of charge of the high voltage battery to the pre-defined lower limit (block 48). If the state of charge of the high voltage battery is not less than or equal to the pre-defined lower limit of the state of charge, i.e., greater than the pre-defined lower limit, then the electric motor/generator continues to maintain engine rotation (block 50) with the fuel flow to the engine prevented. If the state of charge of the high voltage battery is equal to or less than the pre-defined lower limit of the state of charge, then the method may further include re-establishing the fuel flow to the engine when the state of charge of the high voltage battery falls to the pre-defined lower limit (block 52). Using the electric motor/generator to rotate the engine discharges the high voltage battery. Once the state of charge of the high voltage battery falls to the lower limit, then the fuel flow to the engine may be re-established so that the engine may once again produce engine torque. The engine torque in excess of the pre-defined range of the output torque may then be used to operate the electric motor/generator to charge the high voltage battery.

While the best modes for carrying out the invention have been described in detail, those familiar with the art to which this invention relates will recognize various alternative designs and embodiments for practicing the invention within the scope of the appended claims.

The invention claimed is:

1. A method of operating a hybrid powertrain of a vehicle, the hybrid powertrain including an engine, an electric motor and a high voltage battery, the method comprising:
    monitoring a state of charge of the high voltage battery to determine if the state of charge is above a pre-defined upper limit;
    preventing fuel flow to the engine to stop engine torque production when the state of charge of the high voltage battery is greater than the pre-defined upper limit, and when the hybrid powertrain is operating in a second fueling condition in which fuel flow to the engine is preferably maintained; and
    rotating the engine with torque supplied by the electric motor while the fuel flow to the engine is prevented and the hybrid powertrain is operating in the second fueling condition to maintain rotation of the engine.

2. A method as set forth in claim 1 further comprising monitoring an engine torque of the engine.

3. A method as set forth in claim 2 further comprising comparing the engine torque to an output power request to determine if the engine torque is capable of producing an output torque of the hybrid powertrain that is greater than the output power request.

4. A method as set forth in claim 3 wherein preventing a fuel flow to the engine when the state of charge of the high voltage battery is greater than the pre-defined upper limit is further defined as preventing a fuel flow to the engine when the state of charge of the high voltage battery is greater than the pre-defined upper limit and the engine torque produces an output torque of the hybrid powertrain greater than the output power request.

5. A method as set forth in claim 1 further comprising defining a first fueling condition and the second fueling condition.

6. A method as set forth in claim 5 further comprising monitoring an operating parameter to determine if the engine is operating in the first fueling condition or the second fueling condition.

7. A method as set forth in claim 6 wherein the operating parameter includes one of a speed of the vehicle and a temperature of the high voltage battery.

8. A method as set forth in claim 1 further comprising re-establishing the fuel flow to the engine when the state of charge falls to a pre-defined lower limit.

9. A method of operating a hybrid powertrain of a vehicle, the hybrid powertrain including an engine, an electric motor and a high voltage battery, the method comprising:
    monitoring a state of charge of the high voltage battery to determine if the state of charge is above a pre-defined upper limit;
    comparing an engine torque of the engine to an output power request to determine if the engine torque is capable of producing an output torque of the hybrid powertrain greater than the output power request;

preventing fuel flow to the engine to stop torque production when the state of charge of the high voltage battery is greater than the pre-defined upper limit, the engine torque produces an output torque greater than the output power request, and when the hybrid powertrain is operating in a second fueling condition in which fuel flow to the engine is preferably maintained; and rotating the engine with torque supplied by the electric motor while the fuel flow to the engine is prevented and the hybrid powertrain is operating in the second fueling condition to maintain rotation of the engine and to discharge the high voltage battery.

10. A method as set forth in claim 9 further comprising monitoring an engine torque of the engine.

11. A method as set forth in claim 10 further comprising defining a first fueling condition and the second fueling condition.

12. A method as set forth in claim 11 further comprising monitoring an operating parameter to determine if the engine is operating in the first fueling condition or the second fueling condition.

13. A method as set forth in claim 12 wherein the operating parameter includes one of a speed of the vehicle and a temperature of the high voltage battery.

14. A method as set forth in claim 9 further comprising re-establishing the fuel flow to the engine when the state of charge falls to a pre-defined lower limit.

15. A method of operating a hybrid powertrain of a vehicle, the hybrid powertrain including an engine, an electric motor and a high voltage battery, the method comprising:

monitoring a state of charge of the high voltage battery to determine if the state of charge is above a pre-defined upper limit;

comparing an engine torque of the engine to an output power request to determine if the engine torque produces an output torque of the hybrid powertrain that is greater than the output power request;

preventing fuel flow to the engine to stop torque production when the state of charge of the high voltage battery is greater than the pre-defined upper limit, the engine torque produces an output torque greater than the output power request, and when the hybrid powertrain is operating in a second fueling condition in which fuel flow to the engine is preferably maintained;

rotating the engine with torque supplied by the electric motor while the fuel flow to the engine is prevented and the hybrid powertrain is operating in the second fueling condition to maintain rotation of the engine; and re-establishing the fuel flow to the engine when the state of charge falls to a pre-defined lower limit.

16. A method as set forth in claim 15 further comprising defining a first fueling condition and the second fueling condition.

17. A method as set forth in claim 15 further comprising monitoring an operating parameter to determine if the engine is operating in the first fueling condition or the second fueling condition, wherein the operating parameter includes one of a speed of the vehicle and a temperature of the high voltage battery.

18. A method as set forth in claim 15 further comprising monitoring an engine torque of the engine.

* * * * *